3,031,380
PROCESS FOR ENZYME PRODUCTION
Toyosaku Minagawa and Takashi Hamaishi, Tokyo, Japan, assignors, by mesne and direct assignments, to Pacific Laboratories, Inc., a corporation of Hawaii
Filed Nov. 16, 1959, Ser. No. 853,349
8 Claims. (Cl. 195—66)

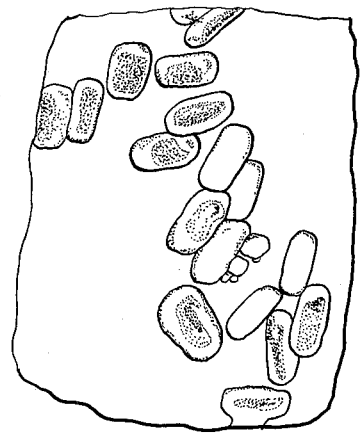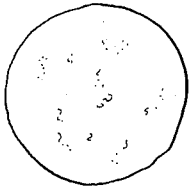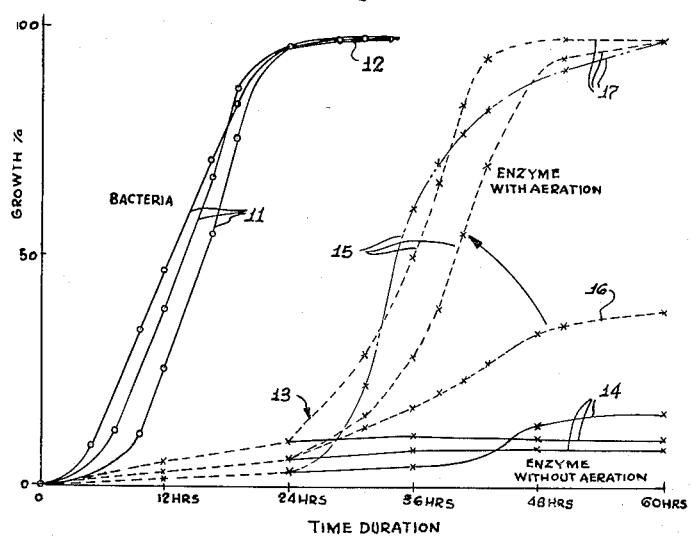

This invention relates to enzymes and the production thereof, and more particularly to the production of amylase and protease.

It is an object of this invention to provide improved methods for the production of enzymes.

It is another object of this invention to provide methods for producing enzyme having much higher unit strength than previously available from commercial methods.

It is another object of this invention to provide methods for producing enzyme at relatively low cost and which may be commercially exploited economically.

Present methods of producing enzyme yield a product which, by virtue of its affinity for moisture, is relatively unstable and must be preserved under very strict and rigid conditions. It is an object of this invention to provide methods for producing enzymes which are relatively stable, particularly in having little affinity for moisture, so that they may be stored at room temperature, humidity, and pressure, without special storage precautions, and so stored will retain their efficacy and power indefinitely.

It is another object to provide a method of producing enzyme of higher purified potency than heretofore.

It is another object of this invention to provide enzymes, particularly protease and amylase, which in addition to having very high unit strength, are relatively colorless, odorless, tasteless, and water-soluble.

The present invention involves basically the production of enzyme, particularly amylase and protease, through the productive power of suitable bacteria, in particular Bacillus subtilis. In general, the method involves subjecting the Bacillus subtilis to prolonged X-ray treatment, isolating a predetermined and newly identified strain of the bacteria thus X-rayed, multiplying the bacteria in a special culture suitable for this purpose (the nature of the culture determining the particular enzyme which will be produced), effecting production of enzyme by the aeration of the culture after the bacteria growth has leveled off, and separating and purifying the enzyme by suitable washing and filtration.

Specific details and modifications of the process will now be described with reference to the following drawings, wherein:

FIG. 1 is a picture of the starting bacillus, enlarged 875,000 times;

FIG. 2 is a picture of the mutated bacillus, enlarged 17,500 times;

FIG. 3 is a cross section of a mutated bacillus;

FIG. 4 is a plan view of a mutated bacillus;

FIG. 5 is a cross section of an unmutated bacillus;

FIG. 6 is a plan view of an unmutated bacillus; and

FIG. 7 are graphs illustrating the process.

The present invention is practiced as follows. To start the process, one isolates Bacillus subtilis in a typical culture such as a jellified broth, by standard conventional methods. The colony is allowed to multiply at 33° C. for approximately 24 hours.

The culture used consists essentially of a beef broth made from lean beef ground up and boiled in ten parts of water for one hour at 90° C. To this broth is added peptone, 1% by weight, and sodium chloride, 0.5% by weight. The broth is then boiled and 3% of agar-agar is then added.

A selected colony of substantially pure Bacillus subtilis is then separated from the original culture broth and is replanted in a new sterile culture of the same type. FIG. 1 illustrates an isolated bacillus.

The replanted Bacillus subtilis colony is allowed to further multiply in the new culture at 33° C. for approximately 12 hours. While still in this culture, the colony is then subjected to X-rays for a period of at least one-half hour and preferably ranging from one hour to two hours. The X-rays used are derived from standard medical X-ray equipment (which has an intensity of from 24 to 50 roentgens), and the X-ray generator is placed approximately 30 centimeters from the Bacillus subtilis colony. The X-ray exposure is normal to the surface of the culture upon which the colony resides.

At the time of the first isolation, and before the X-ray exposure, the Bacillus subtilis appears substantially as indicated in FIG. 1. Up to this point, the cultures have been effected in any suitable medium and vehicle, preferably in a test tube placed on its side.

Following the X-ray treatment, the colony is isolated from its culture and replanted in a sterile culture of the same type contained in a shallow tray, i.e., a plane culture. The transplanted colony is left in the plane culture for at least 24 hours at approximately 33° C. A colony of Bacillus subtilis having predetermined characteristics identifiable visually is then isolated from the plane culture and from the other colonies and transplanted in a sterile test tube culture of the same type. The transplanted colony is selected as the one which has experienced a preselected desired mutation as a result of the X-ray treatment and which is thus conditioned to produce the enzyme desired as the end product of this process.

The colony having this desired mutation is recognized by a characteristic change in each cell, shown in FIG. 2. By comparing FIG. 2 with FIG. 1, one will note that the cell has undergone certain changes. In the first place, the tiny hairs or feelers associated with the cell have disappeared. Secondly, it will be noted that a characteristic large dark spot has appeared in the cell, leaving a relatively narrow, uncolored ring around the outside.

Further magnified (and not visible in FIG. 2), the desired strain is identified by the fact that the desired cells are rough and jagged, as shown in FIGS. 3 and 4, whereas the undesired strains which have not experienced the particular mutation desired for this process are smooth and glossy, as shown in FIGS. 5 and 6. The desired strain has a dull white appearance, as opposed to a glossy gray appearance in the undesired strains. At this point, the first phase of the enzyme production process is concluded. If desired, one may proceed immediately into the second phase, or, alternatively, may store the isolated mutated Bacillus subtilis in refrigerated environment indefinitely until ready for the second phase. A suitable storage temperature is around 5° C. When thus properly stored, the colony preserves its characteristics and qualities indefinitely.

When ready for enzyme production, the stored, mutated colony is expanded by multiplication using any desired and known technique.

The expanded colony is now ready to produce enzymes. In accordance with the present invention, two major types of enzyme may be produced from this colony, one predominating in protease; the other in amylase. For the production of protease, a corn meal culture or base is employed. This culture is prepared in the following manner:

Whole grains of corn are ground to any desired size. While the size has no bearing on the process, it is preferred not to reduce the grains to a powder form because of the tendency to cake and mat. The ground corn is then mixed with water in approximately 54% by weight. The culture thus prepared is then sterilized for about 35 minutes at 110° C. and 20 lb. steam pressure. This sterilization is preferably conducted in the same containers as those which will be used for the culturing of the mutated bacteria when it is ultimately planted in the base. These containers preferably consist of flat trays approximately 3 centimeters deep and 35 x 50 centimeters in area. They are preferably porcelain-lined. During sterilization, it is desirable to keep a lid on the tray.

It has been found that the potency of the enzyme produced, measured in units of tyrosine casein (in the case of protease), or by the dextrine method (in the case of amylase), may be markedly increased by as much as 60%, by adding calcium acetate to the base or culture in an amount of one part in 10,000. This is done at the time that the base is being prepared for the planting of the bacteria.

Employing standard techniques, the mutated bacteria are then planted in the tray of corn meal base, allowing for an area expansion of approximately 1,000 to 1. The lid is then replaced on the tray. A number of substantially identical trays are given identical planting treatment and then placed on racks in a housing where the cultures are maintained at a temperature of from 30° C. to 50° C. and preferably from 33° C. to 47° C. for at least 40 hours and preferably about 50 hours. This temperature is maintained by adding or extracting heat, depending upon the atmospheric environment in which the process is being conducted.

During this 50-hour period, the cultures are treated as follows: After approximately 6 or 7 hours, at preferably the higher portion of the range, i.e., 47° C., the lids are removed from the trays. At this point, it has been found that the bacteria start to multiply rapidly, as shown in FIG. 7, wherein the graphs 11 represent typical bacteria growth curves during this process. At about this point, the process becomes exothermic, and it is necessary to extract heat to maintain the temperature at the desired level, which, for the remainder of the process, is from 30° to 47° C. This is preferably done by blowing cool air, i.e., air at about 30° C., through the housing. This air is preferably humidified in order to prevent undue evaporation of the moisture from the corn base.

After approximately 24 hours, the growth curve 11 of the bacteria levels off, as shown at 12, and also at about this point, enzyme production begins in appreciable quantities, as shown at 13.

It has been found in practice that without excess aeration, the enzyme production continues, but slowly, as shown by the graphs at 14. However, if aeration is commenced or continued vigorously, which is the preferred commercial form, the enzyme growth rapidly accelerates, as shown by the typical enzyme growth curves 15. Under moderate aeration, as might be expected, a moderate growth of enzyme is experienced, as shown at 16. As shown at 17 in FIG. 7, production of enzyme levels off after about 48 hours.

It has been found in practice that it is desirable to add to the corn meal base of mixture of rice hulls and/or rice bran, in a proportion of approximately 10%, by weight, of the corn meal mixture, to give porosity to the culture, thereby enhancing the value of the aeration.

The trays are then removed and dried by air drying or vacuum drying at a temperature not exceeding 45° C. At this stage, the contents of the tray comprise a crumbly mixture of corn meal in which is mixed protease enzyme and from which the bacteria have virtually disappeared, leaving only their minute spores. If the drying is carried to the point of approximately 30% moisture, the mixture will keep approximately one week before further processing is necessary. If dried completely, it may be stored for years without deleterious effects.

As mentioned, the enzyme produced is principally protease, although it has been found that from this corn base, there is also produced a small quantity of amylase. For example, it has been found that of the enzyme mixture (when ultimately separated, as will be explained hereinafter), the enzyme consists of approximately 75% protease and 25% amylase.

The process of this invention may also be used to produce enzyme predominating in amylase. For this purpose, the base, instead of being made of corn meal, is a wheat base prepared substantially as follows:

Wheat bran is mixed with 50% by weight of water. This mixture is then sterilized in the trays, as in the case of the corn meal described hereinbefore. The *Bacillus subtilis*, mutated as described hereinbefore by X-rays, is then planted in the mass and the culture is subjected to the same treatment as described hereinbefore in connection with the corn meal.

The production and growth curves are substantially as described in connection with FIG. 7, except in this case the enzyme produced is not predominantly protease, but amylase. In the case of the wheat brain base, the enzyme produced consists of approximately 75% amylase and 25% protease.

It has been found that if wheat bran alone is used, as described above, the amylase produced consists of two forms: an active form and an inactive form, of which the inactive form predominates in a ratio of approximately 5 to 1. This form is not as useful commercially as the active form, and in order to increase production of the active form, it has been found that if the culture consists of wheat bran to which has been added rice hulls or rice bran in an amount of 10% by weight of the total culture mixture, the amylase produced is almost entirely in the active form, which is the more useful form. However, even without use of rice hulls or bran, the 5 inactive parts of amylase may be made active by acidifying the filtrate during purification, as will be explained hereinafter.

It has been found in practice that the yield of amylase may be shifted predominantly to the inactive form of amylase by using a wheat bran base without the rice hulls or rice bran. Therefore, in employing the wheat base, the amylase may be produced in either active or inactive form, depending upon whether the base is modified with the addition of the rice hulls or rice bran, as explained hereinbefore.

This concludes what may be called phase 2 of the process, and the enzyme, mixed wtih the dry base or culture in which it was made, may now be stored indefinitely, as long as it is sealed against moisture.

The third phase of the process consists of separating the enzyme from the base and then purifying it. This is accomplished substantially as follows:

To a given quantity of the dried or substantially dried bran or corn meal mix containing the produced enzyme is added 16 parts of water by weight. This dissolves out the enzyme from the base, and the liquid is then separated from the insoluble base particles by filtration or other means.

The moist residue still contains enzyme and it has been found commercially feasible to again wash the residue with approximately 14 parts water, by weight, and again filter. These two filtrates are added together to give an enzyme solution in the 30 parts of water and having a potency, in the case of protease, of 4,000 units tyrosine casein, and in the case of amylase, of 4,000 units by the dextrine method.

It has been noted that if the process described to this point is practiced without subjecting the *Baccillus subtilis* to X-rays, the potency of the resulting enzyme ranges from only 600 to 800 units of tyrosine casein, in the case of protease, and approximately the same range for amylase, measured by the dextrine method.

It has been found in practice that the residue remaining may be dried and then used as a valuable feed, still containing enzyme having a potency, in the case of protease, of 1,500 units tyrosine casein, and in the case of amylase, 1,500 by the dextrine method. Alternatively, if desired, the residue may be again washed as above, to produce more enzyme, having the above mentioned 1,500 unit strength; but it has been found as an economic matter that it is just as feasible to use the entire mixture in dry form as feed.

The filtrate containing the dissolved enzyme is treated as follows: First, a 0.5% water solution of calcium acetate is prepared. To 500 cubic centimeters of the water solution of the enzyme is added from 7 to 10 ccs. of a 0.5% calcium acetate solution. A 20% solution of lead acetate solution is then added to the 500 ccs. of enzyme-containing filtrate. To this mixture is slowly added ammonium hydroxide to raise the pH of the mixture to a range of somewhere between 6.8 and 7.2. This action precipitates out certain undesired impurities, which are protein-like and have enzyme-like properties, but are without the potency of a true enzyme. These precipitated impurities are separated by filtration.

To the filtrate is added powdered ammonium sulfate in a proportion of 1 gram of sulfate per 10 ccs. of solution. Then 20% concentrated solution of a mild organic acid, such as acetic or lactic acid, is added in quantity sufficient to bring the pH into a range of 5.8 to 6. This precipitates lead sulfate and calcium sulfate, which is filtered off.

In the case of amylase, this also changes the inactive parts to an active form, in those cases where the wheat culture was used without rice hulls.

To the filtrate is again added powdered ammonium sulfate, e.g., 800 ccs. of filtrate to 450 grams of sulfate. This produces a salting-out of the enzymes, wherein the filtrate, instead of being an essentially aqueous solution, now becomes a dilute solution of ammonium sulfate in which the enzyme is relatively insoluble and precipitates out. The mixture is then filtered and the residue contains the precipitated enzyme which is the desired end product. In this amnner, the enzyme is separated from undesired impurities. The filtrate contains undesired impurities such as sugar, dextrine, soluble starch, and other unsalted materials. The filtrate is then discarded. The residue, consisting of the desired enzymes, is dissolved in water, 140 grams of enzyme to 600 ccs. of water. To this solution is added 90 grams of ammonium sulfate and then a 4% solution of ammonium hydroxide is slowly added to raise the pH of the solution to about 6.2. This effects a precipitation of the amylase fraction of the enzyme, which is separated by filtrations. To the filtrate is added 80 grams of ammonium sulfate. And this effects precipitation of the protease fraction of the enzyme which is separated by filtration.

Each of the two solid fractions is dissolved in water and passed individually through an ambalite tube, or other suitable alkylamine ion exchanger. This exchanges the sulfate ion for acetate ion, so that the enzyme, instead of being in solution with ammonium sulfate, is now in solution with ammonium acetate. To a given quantity of the liquid is then added from 70 to 80% alcohol, by weight, and in this new solution, the substantially pure enzyme precipitates and separates from the acetate. The substantially pure enzyme is then separated and vacuum-dried, and may be stored indefinitely at room temperature. The finished product, whether protease or amylase, is a dull white powder. To the extent that air is eliminated from the drying process, the finished product will be white. The resulting powder is odorless, tasteless, water-soluble, and may be stored substantially indefinitely under room conditions. No special effort need be made to seal the containers, since the powder does not have a measurable affinity for water.

The invention claimed is:

1. Process for production of enzyme comprising subjecting *Bacillus subtilis* to X-rays of an intensity corresponding substantially to 24–50 roentgens and for an interval of at least half an hour, selecting from the colony thus subjected to X-ray a strain identified by cells having hairless, rough, jagged, spotted and dull white characteristics, separating said strain and placing the separated strain in a culture selected from the group consisting of wheat bran and corn meal, maintaining the culture for a period of at least 40 hours while aerating the culture substantially continuously, and drying the culture.

2. Process for production of enzyme comprising subjecting *Bacillus subtilis* to X-rays of an intensity in a range corresponding substantially to 24–50 roentgens and for an interval of at least half an hour, selecting from the colony thus subjected to X-ray a strain identified by cells having hairless, rough, jagged, spotted, and dull white characteristics, separating said strain and placing the separated strain in a culture selected from the group consisting of wheat bran and corn meal, maintaining the culture for a period of at least 40 hours while aerating the culture substantially continuously, drying the culture, dissolving at least a portion of the enzyme produced by the *Bacillus subtilis* by washing in water, precipitating enzyme from the solution by adding to the solution ammonium sulfate, separating the precipitated enzyme, redissolving the enzyme in water, adding ammonium sulfate to precipitate amylase from the solution, separating the precipitated amylase from the filtrate, precipitating out protease by adding additional ammonium sulfate, separating the precipitated protease from the solution, and drying the precipitates to produce a residue of a colorless, odorless, tasteless and water-soluble enzyme.

3. Process for production of enzyme comprising subjecting *Bacillus subtilis* to X-rays of an intensity in a range corresponding substantially to 24–50 roentgens and for an interval of at least half an hour, selecting from the colony thus subjected to X-ray a mutated strain identified by cells having hairless, rough, jagged, spotted and dull white characteristics, separating said strain and placing the separated strain in a culture of the same type as that from which it was originally created, expanding said strain in said culture, replanting said strain in a new culture selected from the group consisting of wheat bran and corn meal, maintaining the culture for a period of at least 40 hours while aerating the culture substantially continuously, drying the culture, dissolving at least a portion of the enzyme produced by the mutated *Bacillus subtilis* by washing in water, adding to the enzyme solution a solution of calcium acetate, adding to the solution lead acetate, adding ammonium hydroxide, separating the precipitated impurities resulting, precipitating from the solution lead sulfate and calcium sulfate by adding thereto ammonium sulfate, adding to the solution a mild organic acid, separating the precipitate from the solution, precipitating enzyme from solution by adding to the solution ammonium sulfate, separating the precipitated enzyme from the solution, redissolving the enzyme in water, adding ammonium hydroxide, adding ammonium sulfate to precipitate amylase from the solution, separating the precipitated amylase from the filtrate precipitating out protease by adding additional ammonium sulfate, separating the precipitated protease from the solution, individually dissolving the separated amylase and the separated protease in water, passing the redissolved enzyme through an alkyl-amine ion exchanger to remove the sulfate ion, precipitating the enzymes from the solution with alcohol, and drying the resultant precipitates to produce a residue of a colorless, odorless, tasteless and water-soluble enzyme.

4. Process for production of enzyme comprising subjecting *Bacillus subtilis* to X-rays having a concentration ranging from 24 to 50 roentgens for a period of at least ½ hour, selecting from the colony thus subjected to X-ray a mutated strain identified by cells having hairless, rough, jagged, spotted and dull white characteristics, separating said strain and placing the separated strain in a culture selected from the group consisting of wheat bran and corn meal, maintaining the culture for a period of at least 40 hours at a temperature ranging from 30° to 50°

C. while aerating the culture substantially continuously, drying the culture at a temperature not exceeding 45° C., dissolving at least a portion of the enzyme produced by the Bacillus subtilis by washing in water, adding to the enzyme solution a 0.5% solution of calcium acetate in the proportion of seven to ten cubic centimeters per five hundred cubic centimeters of enzyme solution, adding to the enzyme solution 77 to 80 ccs. of 20% solution of lead acetate to the 500 ccs. of solution, adding ammonium hydroxide until the pH of the solution is between 6.8 and 7.2, separating the precipitated impurities, precipitating from the solution lead sulfate and calcium sulfate by adding thereto ammonium sulfate in a proportion of approximately 50 grams of ammonium sulfate for every 500 ccs. of solution, adding to the solution 20% concentrated solution of acetic acid in a quantity to bring the pH into a range of from 5.8 to 6, separating the precipitate from the solution, precipitating enzyme from solution by adding to the solution ammonium sulfate in a proportion of approximately 450 grams of ammonium sulfate to 800 ccs. of solution, separating the precipitated enzyme from the solution, redissolving the enzyme in water in a proportion of approximately 600 ccs. of water to 140 grams of precipitate, adding 4% concentrate ammonium hydroxide to adjust the pH to approximately 6.2, adding ammonium sulfate to precipitate amylase from the solution, in a proportion of approximately 80 grams of ammonium sulfate to 600 ccs. of solution, separating the precipitated amylase, from the filtrate precipitating out protease by adding additional ammonium sulfate in an amount of 80 grams of ammonium sulfate per 600 ccs. of water, separating the precipitated protease from the solution, individually dissolving the separated amylase and the separated protease in water, passing the redissolved enzyme through an alkyl-amine ion exchanger to remove the sulfate ion, precipitate the enzyme from the solution with alcohol, and drying the precipitate to produce a residue of a colorless, odorless, tasteless and water-soluble enzyme.

5. Process for production of enzyme comprising subjecting Bacillus subtilis to X-rays having a concentration ranging from 24 roentgens to 50 roentgens for a period of at least one-half hour, selecting from the colony thus subjected to X-ray a mutated strain identified by cells having hairless, rough, jagged, spotted and dull white characteristics, separating said strain and placing the separated strain in a culture of the same type as that in which it was originally created, expanding said strain in said culture, reisolating said selected strain from said last-mentioned culture into a culture base selected from the group consisting of wheat bran and corn meal, maintaining the culture for a period of at least 40 hours at a temperature ranging from 30° to 50° C. while aerating the culture substantially continuously, drying the culture at a temperature not exceeding 45° C., dissolving at least a portion of the enzyme produced by the mutated Bacillus subtilis by washing in water, again drying the washed culture, rewashing the redried culture to extract additional enzyme, adding to the enzyme solution a 0.5% solution of calcium acetate in the proportion of seven to ten cubic centimeters per five hundred cubic centimeters of enzyme solution, adding to the enzyme solution 70 to 80 ccs. of 20% solution of lead acetate to the 500 ccs. of solution, adding ammonium hydroxide until the pH of the solution is between 6.8 and 7.2, separating the precipitated impurities, precipitating from the solution lead sulfate and calcium sulfate by adding thereto ammonium sulfate in a proportion of 50 grams of ammonium sulfate for every 500 ccs. of solution, adding to the solution 20% concentrated solution of acetic acid in a quantity to bring the pH into a range of from 5.8 to 6, separating the precipitate from the solution, precipitating enzyme from the solution by adding to the solution ammonium sulfate in a proportion of approximately 450 grams of ammonium sulfate to 800 ccs. of solution, separating the precipitated enzyme from the solution, redissolving the enzyme in water in a proportion of approximately 600 ccs. water to 140 grams of precipitate, adding 4% solution of ammonium hydroxide to adjust the pH to approximately 6.2, adding ammonium sulfate to precipitate amylase from the solution, in a proportion of approximately 80 grams of ammonium sulfate to 600 ccs. of solution, separating the precipitated amylase from the filtrate precipitating out protease by adding additional ammonium sulfate in an amount of 80 grams of ammonium sulfate per 600 ccs. of water, and separating the precipitated protease from the solution individually dissolving the separated amylase and the separated protease in water, passing the redissolved enzyme through an alkyl-amine ion exchanger to remove the sulfate ion, precipitating the enzymes from the solution with alcohol, and drying the precipitate to produce a residue of a colorless, odorless, tasteless and water-soluble enzyme.

6. Process for production of enzyme comprising subjecting Bacillus subtilis to X-rays of an intensity in a range corresponding substantially to 24–50 roentgens and for an interval of at least half an hour, selecting from the colony thus subjected to X-rays a mutated strain identified by cells having hairless, rough, jagged, spotted and dull white characteristics, separating said mutated strain and placing the separated strain in a culture including corn meal, maintaining the culture for a period of at least 40 hours while aerating the culture substantially continuously, and drying the culture.

7. The process defined in claim 6 and which includes mixing rice bran in the corn meal culture in a proportion of approximately 10% by weight.

8. The process defined in claim 1 and which includes mixing rice bran in said culture in a proportion of approximately 10% by weight.

References Cited in the file of this patent

UNITED STATES PATENTS 2,820,742    Pontecorvo et al. _____ Jan. 21, 1958

OTHER REFERENCES

Proceedings of The International Symposium on Enzyme Chemistry, Tokyo and Kyoto, 1957, article by Fukumoto et al., pp. 479 to 482, published, 1958, Maruzen, Tokyo, QP 601I 5.